Sept. 16, 1958    G. HOHWART ET AL    2,852,263
ARBOR TWIST CHUCK
Filed May 14, 1956    2 Sheets-Sheet 1

INVENTORS.
George Hohwart.
Ernest F. Hohwart.
BY
Harness, Dickey & Pierce
ATTORNEYS.

Sept. 16, 1958   G. HOHWART ET AL   2,852,263
ARBOR TWIST CHUCK
Filed May 14, 1956   2 Sheets-Sheet 2
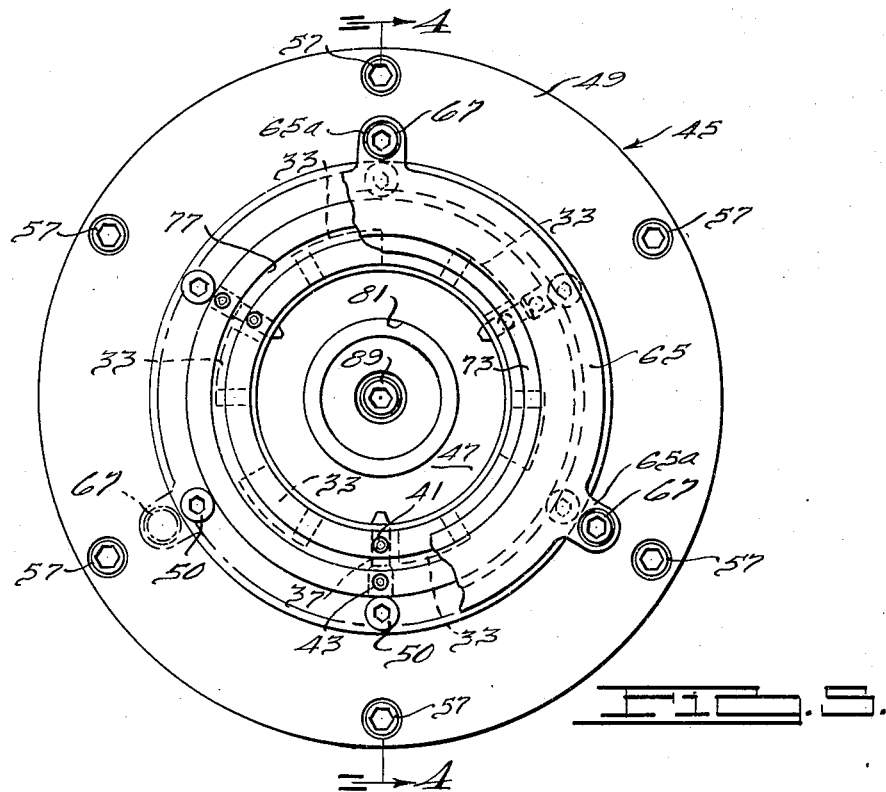
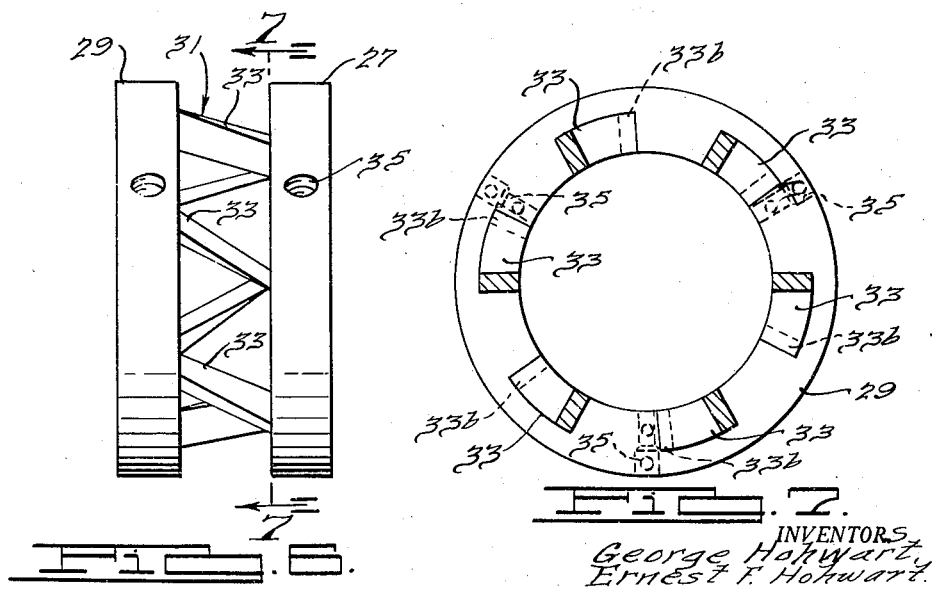
INVENTORS
George Hohwart,
Ernest F. Hohwart.
BY
Harness, Dickey & Pierce
ATTORNEYS United States Patent Office 2,852,263
Patented Sept. 16, 1958

2,852,263
ARBOR TWIST CHUCK

George Hohwart, Farmington Township, Oakland County, and Ernest F. Hohwart, Detroit, Mich., assignors to N. A. Woodworth Company, Ferndale, Mich., a corporation of Michigan Application May 14, 1956, Serial No. 584,546

18 Claims. (Cl. 279—2)

This invention relates generally to arbor chucks and more particularly, to arbor chucks for clamping splined workpieces.

An important object of the invention is to provide an arbor chuck that clamps solidly and holds supported on the chuck a workpiece while machining or other operations are performed thereon.

Another important object of the invention is to provide an arbor chuck that clamps a splined workpiece by axial force applied to the chuck.

It is still another object of the invention to provide an arbor chuck having improved means for applying axial force thereto, whereby it is particularly adapted for high speed chucking operations.

The above and other objects will be apparent during the course of the following description taken in conjunction with the accompanying drawings, wherein preferred embodiments of the invention are clearly shown.

In the drawings:

Fig. 5 is a front elevation of a modified construction of an arbor chuck in combination with means for applying axial force thereto;

Fig. 6 is a side elevation of the arbor sections of the arbor chuck of Figs. 4 and 5; and Fig. 7 is a vertical section on the line 7—7 of Fig. 6.

Figure 1:
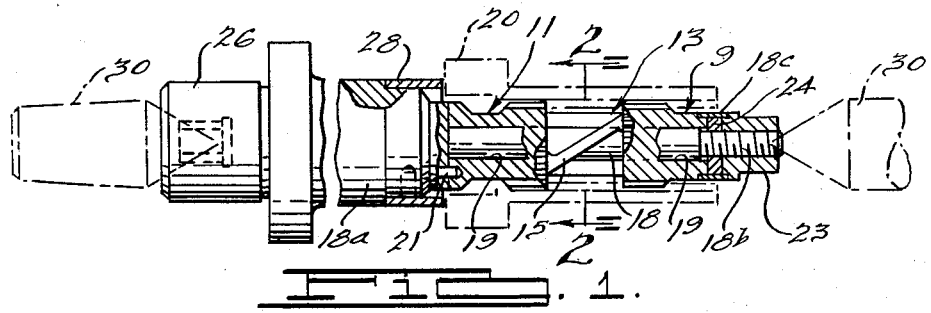
Figure 1 is a longitudinal sectional view with parts in elevation, of an arbor chuck embodying the invention.

This application is a continuation in part of the copending application Serial No. 456,158 filed September 4, 1954, now Patent No. 2,803,159. In the copending application there is claimed an arbor chuck which is adapted to clamp splined workpieces and is constructed and arranged to be actuated by rotational force applied thereto. The present invention is directed to an arbor chuck also adapted to clamp splined workpieces but which is so constructed as to be actuated by axial force applied thereto. By applying axial force to cause the arbor sections to assume various relative rotational positions, although greater force is required, increased speed of chucking can be conveniently effected since the distance through which the applied force moves is proportionately less as the axial force is greater than the rotational force that must be applied to cause the arbor sections to assume a given rotational position. Manifestly, for a given rate of movement of applied force, the speed at which the arbor sections assume the given position in the case of the axially applied force is correspondingly increased. Consequently, the speed of chucking with arbor sections of the present invention can be conveniently enhanced because short distance movements only of applied force are required, and though at a sacrifice of power which can be tolerated, this is important in high speed production operations.

Generally the arbor chuck of the present invention comprises a pair of toothed arbor sections and means interconnecting the arbor sections including torsionally distortionable means which is so constructed as to be yieldable in torsion from axially applied force. The teeth of the arbor sections are arranged to interfit with the splines of a workpiece and, depending upon whether the workpiece has internal or external splines, the teeth on the arbor section are external or internal teeth respectively. The torsionally distortionable means interconnecting the arbor sections normally holds them in a first relative axial position so that the teeth of the arbor sections are in a first relative circumferential relationship, i. e., the teeth of the arbor sections are either normally aligned with respect to the splines of the workpiece so that they simultaneously interfit therewith or they are normally offset with respect thereto so that they cannot be freely engaged simultaneously with the splines of the workpiece. Upon the application of axial force to the interconnecting means the torsionally distortionable means yields in torsion so as to permit the arbor sections to move axially relative to each other from the mentioned first relative axial position to a second relative axial position. The torsionally distortionable means is so constructed and arranged with relation to the arbor sections that, in moving axially relative to each other, they also rotate relative to each other so that the teeth of the arbor sections assume a second relative circumferential relationship which is the opposite of the first, i. e. where the teeth are normally aligned as described they are offset as described and where they are normally offset they are aligned. In an intermediate relative circumferential relationship between the mentioned first and second relationships, the teeth of the arbor sections are urged oppositely against the splines of the workpiece to hold the same securely so that work can be performed thereupon.

In the first embodiment of the present invention, the teeth of the arbor sections are held normally aligned with respect to the splines of the workpiece by the torsionally distortionable means so as to interfit simultaneously therewith. The splines of the workpiece are slipped between the teeth of the arbor sections before axial force is applied to the interconnecting means. Axial force is applied to offset the teeth of the arbor sections to urge them oppositely against the splines of the workpiece and the axial force must be continued to be applied to clamp the workpiece. In the second embodiment, the teeth of the arbor sections are held normally offset by the torsionally distortionable means so that in the mentioned first relative circumferential relationship they cannot be freely engaged simultaneously with the splines of the workpiece before axial force is applied to the interconnecting means. Upon the application of axial force, the teeth of the arbor sections are actuated so as to be aligned with respect to the splines of the workpiece and the latter is slipped between the teeth of the arbor sections. Upon the release of the axial force the workpiece is then securely retained with respect to the chuck, through the inherent resiliency of the torsionally distortionable means which urges the teeth of the arbor sections in opposite directions against the splines of the workpiece.

In each of the embodiments, the torsionally distortionable means comprises at least one resilient reed member which must be obliquely disposed with respect to the axis of the arbor sections so that upon the application of axial force to the interconnecting means the arbor sections are moved both axially and rotationally relatively to each other. As clearly set forth in the copending application, the length of the reed member or members is conflictingly related to the ability of the arbor sections to chuck short workpieces; that is to say, the reed member or members must be of sufficient length to possess the resiliency necessary to securely clamp workpieces, but must be so arranged with respect to the arbor sections that in spite of the length of the reed member or members the arbor sections are sufficiently adjacent to chuck short workpieces. This problem is minimized in the present invention by virtue of the construction of the torsionally distortionable means wherein the resilient reed members must be obliquely disposed with respect to the axis of the arbor sections. The distance axially between their ends is thus further shortened by their angular disposition so that still shorter workpieces can be chucked for any given length of reed member. While the various constructions of interconnecting means described in the above-referred to copending application to overcome this problem can be employed in conjunction with the particular construction of torsionally distortionable means of the present invention, this has been found to be unnecessary as in the usual case the reed member or members can be formed integral with the arbor sections as will be described.

With respect to the angular disposition of the reed members if the angle they make with respect to the axis of the arbor sections is too great, they will not offer sufficient resistance to the externally applied axial force to securely clamp the workpiece, or, depending upon the embodiment, there will not be sufficient torsional energy stored in the reed members from the applied force for the subsequent clamping of workpieces. If the angular disposition of the reed member or members is too small, too great an axial force will be required to rotate the arbor sections. A balance between these opposing considerations is easily attained and the optimum angular disposition of the reed members of necessity depends upon the particular application, taking into account the material of the reed members, the size of the arbor sections and workpiece, the speed of chucking desired, etc.

Figure 2:
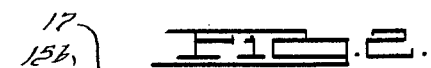
Fig. 2 is a vertical section on the line 2—2 of the structure of Figure 1.
Figure 2:
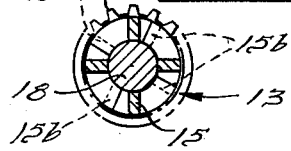
Figure 3:
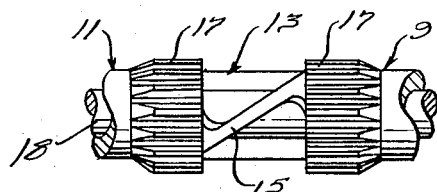
Fig. 3 is a side elevation of the arbor sections of the arbor chuck of Fig. 1.
Figure 3:
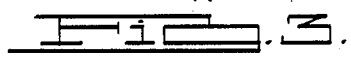

Referring now to the structure in more detail, and specifically to the first embodiment shown in Figs. 1–3, a pair of axially separated arbor sections 9, 11 are joined by interconnecting means, generally designated 13, comprising a plurality of obliquely disposed resilient reed members 15 which, in the instance shown, are integral with each of the arbor sections. While at least one resilient reed member is necessary, preferably there are more than one, and in the embodiment shown there are four such reed members. Each of the resilient reed members 15 is substantially rectangular in cross section, as best shown in Fig. 2, and while shown integral with the arbor sections 9, 11 at opposite ends thereof, each can be otherwise secured as, for example, by welding. At the plane of junction with each of the arbor sections, corresponding ends of each of the resilient reed members 15 preferably are radially disposed with respect to the arbor section they join. Fig. 2 clearly shows the disposition of corresponding ends of each of the resilient reed members 15 where they join the arbor section 11 and the area of junction of each is designated 15b. This means that preferably there is some helical twist in each of the reed members near the ends thereof in the normal unflexed condition of the arbor sections and even greater helical twist is imparted to the reed members during flexing since the ends are forced to follow arcuate paths in opposite directions upon rotation of the arbor sections from axially applied force. The arbor sections 9, 11 are generally cylindrical in shape and have radially enlarged portions at adjacent ends whereon are formed external splines or teeth as at 17 for clamping workpieces having internal splines. Each of the arbor sections has a central bore 19 which extends axially throughout the length thereof and disposed in both central bores is a longitudinal shaft 18 having a radially enlarged head 18a formed integrally at one end thereof. The arbor section 11 is secured to the longitudinal shaft 18 against rotation by way of a pin 21 disposed in the radially enlarged portion 18a and the abutting inner end of arbor section 11. Arbor section 9 is free to rotate and move axially along the shaft 18 by axial force applied thereto.

The means for applying axial force to the interconnecting means 13 in the embodiment shown is by way of the construction on the outer end of the shaft 18 which terminates short of the outer end of the arbor section 9 where a threaded stud portion 18b of reduced diameter is formed integral with the shaft 18 at this end providing an annular shoulder 18c which functions to prevent over-stressing of the reed members as will be described. A nut 23 threadedly engages the stud portion 18b and a washer 24 is disposed between the nut 23 and the outer end of the arbor section 9 so as to be adapted for engaging the annular shoulder 18c. A compressive force is applied axially between the arbor sections 9 and 11 by tightening of the nut 23 to torsionally distort the reed members 15.

In operation of the arbor chuck of this embodiment, the teeth 17 on the arbor sections 9, 11 are in alignment with respect to the splines of a workpiece in the normal unflexed position of the arbor sections before the application of axial force. A workpiece such as that shown in outline in Fig. 1 by way of example and designated 20 is slipped over the teeth of the arbor sections 9, 11 so that the splines thereof are disposed around and simultaneously interfit loosely with the teeth 17 of each of the arbor sections.

To facilitate flexure of the arbor sections a table fixture (not shown) may be provided having a stationary base place provided with an opening which receives and snugly fits the terminal portion designated 26 of the arbor chuck. When a fixture of this type is employed the arbor chuck is uprightly disposed and the workpiece is slipped downwardly onto the arbor sections. A stop 28 can be mounted on the enlarged head 18a to limit the travel of the workpiece 20 and position the same axially with respect to the arbor sections.

Upon tightening, the nut 23 travels inwardly on the stud portion 18b and forces the arbor section 9 inwardly by way of washer 24 while arbor section 11 is held fixed by the radially enlarged head 18a whereupon the reed members 15 yield in torsion. In traveling axially inward, arbor section 11 rotates with respect to arbor section 9 so that the teeth of the two sections become circumferentially offset. Preferably, the maximum amount of torsional distortion of the reed members 15 is such that the amount of offset that can be attained between the teeth of the arbor sections more than exceeds the distance between the flanks of adjacent teeth of the workpiece to be clamped but nevertheless is well below the elastic limit of the reed members. This is achieved by proper design and the maximum stressed condition of the reed member is determined by the location of the annular shoulder 18c as indicated.

The annular shoulder 18c at the outer end of the stud 18 is disposed inwardly of the outer end of arbor section 9 a predetermined distance. This distance determines the limit of travel of the nut 23 since continued tightening of the nut 23 forces the washer 24 into engagement with the shoulder 18c as the overall length between the arbor sections is shortened. In this position the reed members are at maximum stressed condition which by adjustment of the predetermined distance is below their elastic limit by a proper margin of safety. Likewise the amount of offset between the teeth of the arbor sections is a maximum in this position and the workpiece is securely clamped before this position is reached. The particular workpiece to be clamped determines the predeterminedly adjusted conditions and preferably the splines thereof have a distance between adjacent flanks less than the maximum amount of offset that can be imparted to the arbor sections so that it is clamped in an intermediate position between the unstressed and maximum stressed position of the arbor sections. Theoretically, a workpiece could be clamped which has a distance between adjacent splines infinitesimally less than that amount of offset between the teeth of the arbor sections in their maximum stressed position but obviously this is unsatisfactory because of the small order of the force of clamping or chucking. Preferably, the maximum amount of offset between the teeth of the arbor sections should be at least enough so that they cannot be freely engaged simultaneously with the splines of the workpiece and preferably the intermediate position of clamping should occur closest to the maximum stressed condition of the reed members.

The workpiece is retained only so long as axial compressive force is continued to be applied between the arbor sections to urge the teeth of each oppositely against the splines of the workpiece. Upon the release of the axial force the inherent resiliency of the reed members will return the arbor sections to their normal unstressed position by which the arbor section 9 moves axially away from arbor section 11 and simultaneously rotates with respect thereto so that the teeth of the two sections are again in alignment. The workpiece can be slipped off the end of the chuck, a new workpiece inserted and the operation repeated. The head 18a is made relatively long to provide ample room for a cutter or other machine tool and preferably the ends of the arbor chuck are beveled as shown for mounting between centers 30. If one of the centers is a live center, a conventional driving arm and dog (not shown) can be provided in the usual manner to establish a driving connection between the arbor and the live center.

Referring now to Figures 4–7 therein is shown an arbor chuck having improved means for applying axial force which particularly adapts it for high speed chucking operations. In the embodiment shown, the axially applied force is a compressive force applied by a compact construction and the arbor sections are arranged to clamp workpieces having external splines. Fig. 6 shows in greater detail spaced arbor sections 27, 29 of this embodiment, and the interconnecting means therefore, generally designated 31, which is integral with the arbor sections and includes torsionally distortionable means of similar construction as in the previous embodiment. The torsionally distortionable means comprises at least one resilient reed member as mentioned and in the instance shown there are six such angularly spaced reed members 33 joined at opposite ends to each of the arbor sections 27, 29. The reed members 33 are obliquely disposed with respect to the axis of the arbor sections and corresponding ends of each of the reed members are radially disposed with respect to the arbor section they join, as previously described, the junction of one end of the reed members with the arbor section 29 being shown in Fig. 7 and the area of each at the plane of junction being designated 33b. A suitable number of radially directed apertures 35 are provided about the periphery of each of the arbor sections to receive pins or teeth 37, the ends of which are tapered as at 37b to provide internal teeth to engage the external splines of a workpiece. Three such pins are employed in the form of the invention shown and they are circumferentially staggered with respect to the reed members 33. Each of the pins 37 is adjustable radially by means of an adjusting screw 39 and a set screw 41 is disposed to lock each pin after it has been adjusted and a similarly disposed set screw 43 is provided to lock each adjusting screw 39. It will be apparent that the pins in each of the arbor sections can be independently spaced circumferentially in any of the respective apertures 35 to accommodate widely variant splined workpieces.

Figure 4:
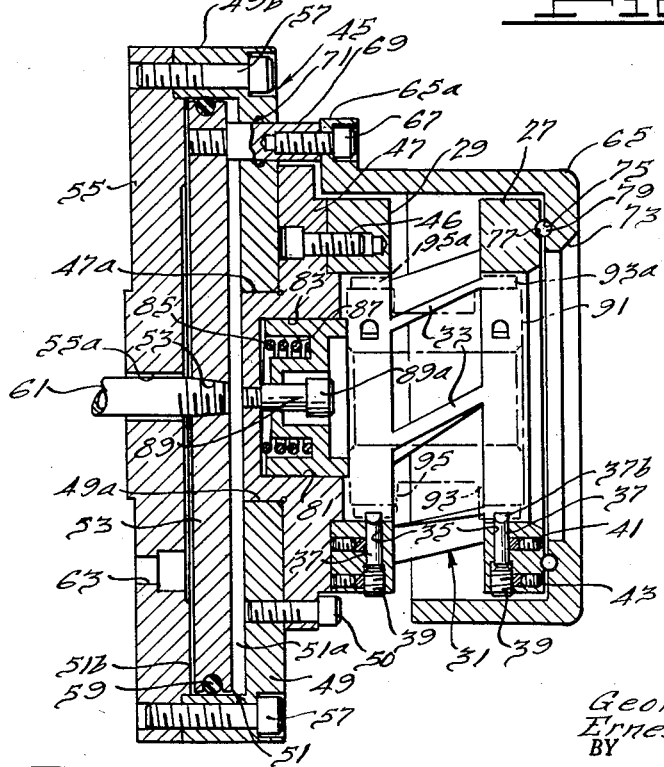
Fig. 4 is a vertical section taken on the line 4—4 of Fig. 5.

The combination with the arbor chuck of means for applying axial force to the interconnecting means is best shown in Fig. 4 and comprises a stationary structure generally designated 45 to which one of the arbor sections is secured, and in the instance shown, arbor section 29 is secured to a back-up member 47 by way of machine screws 46. The back-up member 47 is a part of the stationary structure of the arbor chuck being secured to a forward wall member 49 as by machine screws 50 and has integral therewith a cylindrical boss 47a which closes off the central bore 49a of the forward wall member 49 with which it cooperates to provide a solid forward wall for a cylindrical piston chamber, generally designated 51, in which a piston 53 is slidably disposed. The forward wall member 49 is somewhat cylindrical by virtue of the disposition of the inturned rim portion 49b thereof which abuts with the recessed periphery of a rear wall member 55 to which it is solidly secured by suitable means as by machine screws 57 for forming the piston chamber 51.

The inlet side, designated 51a, of the piston chamber is separated from the outlet side, designated 51b, by suitable sealing means and in the form shown by an O-ring 59 secured about the periphery of the piston 53. An inlet pipe 61 is adapted to move axially within an opening 55a in the rear wall member through which it extends so as to be threadably engaged in an aperture 53a in the piston 53 whereby it communicates with the inlet side of the piston chamber 51a. The opening 55a, through which the inlet pipe 61 extends, serves as the outlet for the displaced fluid and communicates with the outlet side 51b of the piston chamber. The opening 63 is provided for the reception of a socket head screw or the like, for fastening the arbor chuck to the spindle of the automatic machine. Fluid under pressure is admitted through the inlet 61 to move the piston to the left as viewed in Fig. 4 while the displaced fluid exits through the outlet 55a. Movement of the piston 53 pulls a cap 65 inwardly toward the stationary structure 45 since the cap 65 is secured to the piston 53 by machine screws 67 each of which extends through ears 65a of the cap 65 and is threadably secured in one end of a stud member 69, the other end of which threadably engages the piston 53 as shown. Three such stud members 69 are provided in the embodiment shown, each of which extends through an opening in the forward wall member 49 in which it is slidably disposed and sealed by an O-ring 71. The cap 65 is generally cup-shaped and the front face thereof is provided with an enlarged central opening 73. On the inner surface of the front face of the cap 65 and radially spaced from the central opening 73 is formed an annular depression 75 which together with a similar face-opposed annular depression 77 in the arbor section 27 forms a ball bearing race in which a plurality of ball bearings 79 are provided to permit rotation of arbor section 27 as the same is moved axially inward by movement of the cap 65.

Ejector means are provided which comprise a pusher member 81 slidably disposed in a recess 83 formed in the front face of the back-up member 47 and normally urged to the right as viewed in Fig. 4 by a compression spring 85 disposed in an annular well 87 formed in the rear section of the pusher member 81. A suitable stop 89 carrying the pusher member 81 is secured to the back-up member 47 and has an enlarged head 89a for limiting the travel of the pusher member 81 in ejecting a workpiece. A workpiece in the form of a double gear such as that shown in outline and designated 91 has spaced gear sections 93, 95 and is inserted through the enlarged opening 73 in the cap 65 when the teeth of the arbor sections are aligned with respect to the splines 93a, 95a on the gear sections 93, 95 respectively. The workpiece 91 is forced against the pusher member 81 as will be presently described.

In operation, the teeth of the arbor sections, provided as described by the pins 37, are normally retained circumferentially offset with respect to the splines of the workpiece by the reed members 33. In this unstressed position of the arbor sections the workpiece 91 cannot be freely engaged simultaneously with the pins of each of the arbor sections. It should be understood that when the teeth of the arbor sections are aligned so as to simultaneously interfit with the splines of a workpiece they are not necessarily aligned with each other although this is the usual case, as for example, when employing a workpiece having only a single splined portion in which the splines are identically aligned over the length thereof. However, where the workpiece has more than one splined portion and the splines of each portion are themselves offset with respect to each other, the teeth of the arbor sections, while aligned to simultaneously interfit with the splines of the workpiece, may be offset with respect to each other. Similarly when the teeth of the arbor sections are offset so that they cannot be simultaneously engaged with the splines of the workpiece, they are not necessarily offset with respect to each other as conceivably they could be aligned with respect to each other and still be offset with respect to the splines of a workpiece in the case of the workpiece wherein the splines themselves are offset. Fluid under pressure is admitted through the inlet pipe 61 and withdrawn from the outlet 55a to actuate the piston 53 which pulls the cap 65 inwardly toward the stationary structure of the arbor. The arbor section 27 is forcefully moved axially inward against the action of the reed members 33 toward the arbor section 29 which is held fixed against movement by the means described. The axially applied force causes the reed members to torsionally yield so that as arbor section 27 moves inwardly it simultaneously rotates and by suitable means (not shown) the movement of the arbor section is automatically stopped when the teeth of the arbor sections are aligned with respect to the splines of the workpiece 91. The workpiece 91 is then inserted through the enlarged opening 73 and slipped over the teeth of the arbor sections so that the splines 93a and 95a are disposed around and simultaneously interfit loosely with the teeth of each of the arbor sections 27, 29 respectively. While in this relationship the workpiece is forced into engagement with the pusher member 81 against the urging of the spring 85 whereupon the pusher member 81 is moved to the position shown in Fig. 4. The fluid pressure is then cut off and the workpiece is immediately clamped by the inherent resiliency of the reed members 33 which tend to return each of the arbor sections to their normal unstressed position in a direction opposite to that in which each was actuated for stressing. This is prevented of course by the interposition of the splines of the workpiece in each of the directions in which the teeth of the arbor sections tend to move relatively. Consequently, the teeth of the arbor sections engage opposite sides of the splines of the workpiece and securely clamp the same with a force equal to that stored by the torsionally distorted reed members. Thusly chucked, the workpiece may be worked on by machining or allied operations without slightest movement thereof. When it is desired to release the workpiece and insert another, fluid pressure is again admitted to the piston chamber 51 to actuate the piston 53 in the same direction as before wherewith the cap 65 causes the arbor section 27 to again move axially inwardly toward arbor section 29 and simultaneously rotate with respect thereto to bring the teeth of the arbor sections into alignment with respect to the splines of the workpiece. When this occurs, movement of the arbor section 27 is again automatically stopped and immediately the workpiece is ejected from its clamped position to a handling position wherein part of the workpiece extends beyond the enlarged opening 73 so that it may be readily removed from the arbor chuck whereupon another workpiece may be inserted. It will be apparent that handling of the workpiece can be accomplished entirely by automatic machinery. Ejection of the workpiece is accomplished by movement of the pusher member 81 through the urging of the compression spring 85 which is operative immediately as the force against the splines of the workpiece to retain the same is less than the force stored in the spring. The rate of chucking of workpieces is exceptionally high by virtue of the construction described and when employed on automatic machines which turn out parts at rates of the order of several hundred per minute the same contributes substantially to the economies that can be realized in production runs.

It will thus be seen that there has been provided by this invention an arbor chuck in which the various objects hereinabove set forth together with many thoroughly practical advantages are successfully achieved.

While preferred embodiments of the invention have been shown and described it is to be understood that changes, modifications and variations may be made without departing from the spirit of the invention or scope of the appended claims.

What is claimed is:

1. A chuck for chucking a splined workpiece comprising a pair of toothed sections spaced one from the other and having their longitudinal axes aligned, and means interconnecting said sections including torsionally distortionable means comprising a resilient reed member obliquely disposed with respect to the longitudinal axis of said sections normally holding said sections in a first relative axial position so that the teeth of said sections are in a first relative circumferential relationship and adapted to permit limited axial movement between said sections, said reed member being constructed and arranged with respect to said sections to torsionally yield upon the application of force to said interconnecting means axially of said sections so as to move said sections axially relative to each other from said first relative axial position to a second relative axial position and to simultaneously rotate said sections relative to each other so that the teeth of said sections are in a second relative circumferential relationship, the teeth of said sections in one of said relative circumferential relationships being aligned to interfit simultaneously with the splines of the workpiece and in the other of said relative circumferential relationships being offset so that the teeth of said sections cannot be freely engaged simultaneously with the splines of the workpiece, and the teeth of said sections in a third circumferential relationship intermediate said first and said second relative circumferential relationships being adapted to be urged oppositely against the splines of the workpiece to hold the same securely but removably clamped by said chuck.

2. The invention according to claim 1 wherein the teeth of said sections by said torsionally distortionable means are normally held offset in said first relative circumferential relationship so that the teeth of said sections cannot be freely engaged simultaneously with the splines of the workpiece, and wherein the teeth of said sections in said second relative circumferential relationship are aligned to interfit simultaneously with the splines of the workpiece while said axial force is continued to be applied to said interconnecting means, and wherein the teeth of said sections in said third relative circumferential relationship are urged oppositely against the splines of the workpiece by the inherent resiliency of said reed member upon release of said axial force.

3. The invention according to claim 1 wherein the teeth of said sections by said torsionally distortionable means are normally held aligned in said first relative circumferential relationship so that the teeth of said sections interfit simultaneously with the splines of the workpiece, and wherein the teeth of said sections in said second relative circumferential relationship are offset so that they cannot be engaged simultaneously with the splines of the workpiece while said axial force is continued to be applied to said interconnecting means, and wherein the teeth of said sections in said third relative circumferential relationship are urged oppositely against the splines of the workpiece while said axial force is continued to be applied to said interconnecting means.

4. The invention according to claim 2 wherein the teeth of said sections are internal teeth adapted to chuck externally splined workpieces.

5. The invention according to claim 3 wherein the teeth of said sections are external teeth adapted to chuck internally splined workpieces.

6. The invention according to claim 4 wherein said means interconnecting said sections comprises said sections and a plurality of circumferentially spaced reed members integrally joined at opposite ends to each of said sections radially outwardly from the pitch circle of said internal teeth of said sections, each of said reed members being obliquely disposed with respect to the axes of said sections.

7. The invention according to claim 5 wherein said means interconnecting said sections comprises said sections and a plurality of circumferentially spaced reed members integrally joined at opposite ends to each of said sections radially inwardly from the pitch circle of said external teeth of said sections, each of said reed members being obliquely disposed with respect to the axes of said sections.

8. The invention according to claim 6 wherein one of the said opposite ends of each of the said reed members is radially disposed with respect to one of the sections at the area of junction between said one opposite end and said one section and the other of the opposite ends of each of the said reed members is radially disposed with respect to the other of the said sections at the area of junction between said other opposite end and said other section.

9. The invention according to claim 7 wherein one of the said opposite ends of each of the said reed members is radially disposed with respect to one of the sections at the area of junction between said one opposite end and said one section and the other of the opposite ends of each of the said reed members is radially disposed with respect to the other of the said sections at the area junction between said other opposite end and said other section.

10. The invention according to claim 8 further comprising means to apply axial compressive force to said sections to cause said reed members to torsionally yield so as to move said sections relatively axially closer from said first relative axial position to said second relative axial position and to simultaneously rotate said sections relative to each other so that said internal teeth of said sections are actuated from said first relative circumferential relationship where they are held normally offset so as not to be freely engageable simultaneously with the external splines of the workpiece to said second relative circumferential relationship where they are aligned to interfit simultaneously with the external splines of the workpiece, said means to apply axial compressive force being constructed and arranged to continue to apply axial compressive force to retain said sections in said second circumferential relationship while the workpiece is slipped over said internal teeth of said sections so that the external splines of said workpiece loosely interfit simultaneously therewith, said means to apply axial compressive force also being arranged to be thereafter released so that the inherent resiliency of said reed members urges said internal teeth of said sections oppositely against the external splines of the workpiece to hold the same securely but removably clamped by said chuck.

11. The invention according to claim 9 further comprising means to apply axial compressive force to said sections to cause said reed members to torsionally yield so as to move said sections relatively axially closer from said first relative axial position to said second relative axial position and to simultaneously rotate said sections relative to each other so that said external teeth of said sections are actuated from said first relative circumferential relationship where they are held normally aligned to interfit simultaneously with the internal splines of the workpiece to said second relative circumferential relationship where they are held offset so as not to be freely engageable simultaneously with the internal splines of the workpiece, said means to apply axial force being arranged to continue to apply axial force to said sections to cause said reed members to torsionally yield so that said external teeth of said sections are actuated to said third circumferential relationship intermediate said first and second relationships whereby to urge said external teeth of said sections oppositely against the internal splines of the workpiece to hold the same securely but removably clamped by said chuck.

12. The invention according to claim 10 wherein each of said sections is generally disc-shaped and has central apertures and wherein the teeth of each of said sections are removable therefrom and circumferentially spaced and disposed so as to be directed radially inwardly into said central apertures of said each section.

13. The invention according to claim 12 wherein the means to apply axial compressive force comprises a stationary structure having a piston chamber, a piston slidably disposed in said chamber, a source of pressure fluid, inlet means for conveying pressure fluid into said chamber on one side of said piston, outlet means for conveying pressure fluid out of said chamber from the other side of said piston, means securing one of said sections solidly to said structure whereby the other of said sections is free to move axially and rotatably with respect to said one section, a cap having an enlarged central opening disposed contiguously with one side of said other section with the axis of said enlarged opening concentric with the axis of said central apertures in said other sections, anti-friction means between said cap and said other section enabling said other section to rotate with respect to said cap, means connecting said cap to said piston whereby fluid pressure entering said piston chamber pulls said cap inwardly toward said structure against said other section to cause said reed members to torsionally yield so as to move said other section axially inward toward said one section and to simultaneously rotate said other section with respect to said one section so that the teeth of said sections are actuated relatively from the mentioned normally offset relationship to the mentioned aligned relationship, means to continue the supply of pressure fluid into said chamber to yieldably retain said sections aligned against the distortion of said reed members while the workpiece is slipped over the internal teeth of said sections so that the external splines of said workpiece loosely interfit simultaneously therewith, means to thereafter cut off the supply of pressure fluid to said piston chamber so that the inherent resiliency of said reed members urges said internal teeth of said sections oppositely against the splines of the workpiece to hold the same securely but removably clamped by said chuck.

14. The invention according to claim 13 further comprising ejecting means including a pusher member slidably disposed in said structure so as to be operative through the central aperture of said one section, a compression spring normally urging said pusher member outwardly from said structure, stop means limiting the movement of said pusher member outwardly from said structure, said pusher member being constructed and arranged with relation to said sections and said structure so as to be actuated inwardly toward said structure to a temporary position against the urging of said compression spring by force applied to the workpiece upon insertion of the same through the said central apertures of each of the said sections, said pusher member being retained in said temporary position during the clamping of said workpiece, said pusher member, upon the reentrance of fluid pressure to said chamber to again actuate relatively the teeth of said sections to the mentioned aligned relationship to release said workpiece, being operative to actuate the workpiece outwardly from said structure so that a portion thereof extends beyond said enlarged opening whereby to increase the speed of handling the workpiece.

15. The invention according to claim 11 wherein each of said sections is generally cylindrical in shape and has a central longitudinally extending bore and a radially enlarged portion on which the said external teeth of said each section are formed and wherein the means to apply axial compressive force to said sections comprises a longitudinal shaft disposed in the said central bores of said sections having a radially enlarged portion on one end abutting with one of the sections and a threaded stud portion of reduced diameter on the other end thereof, means for securing said one section on said shaft against rotation with respect thereto whereby said other section is adapted to be moved axially and rotatably with respect to said one section, an annular shoulder formed at the base of said stud portion and disposed inwardly of the free end of said other section a predetermined distance, fastening means threadably engaging said stud portion adapted to be rotated thereon so as to engage said free end of said other section to cause said reed members to torsionally yield so as to move said other section axially inwardly toward said one section, axial movement of said one section being prevented by said radially enlarged portion, rotation of said fastening means also being adapted to simultaneously rotate said other section so that the teeth of said sections are actuated relatively from the mentioned normally aligned relationship to the mentioned offset relationship whereby they are not freely engageable simultaneously with the internal splines of the workpiece, said annular shoulder limiting the travel inwardly of said fastening means in an extreme position to prevent overstressing of said reed members, said fastening means being arranged with respect to said sections, when the workpiece is slipped over said external teeth of said sections in the mentioned aligned relationship to loosely interfit simultaneously therewith, to urge said external teeth of said sections oppositely against the splines of the workpiece intermediate the extreme position of said fastening means and to continue the application of axial compressive force to hold the workpiece securely but removably clamped by said chuck.

16. An arbor for chucking internally splined workpieces comprising a pair of similar, coaxially disposed, externally splined sections joined by an annular series of integral, flexible and resilient reed members, all of said reed members being correspondingly inclined obliquely with respect to the axes of said sections and holding the external splines of the sections normally in alignment with respect to each other so as to accommodate an internally splined workpiece thereon, said reed members being operative to rotate one of said sections relative to the other when said arbor is compressed along its axis so as to offset the external splines of the sections and press the same laterally in opposite directions against the internal splines of the workpiece whereby to hold the workpiece securely on the arbor.

17. An arbor for chucking internally splined workpieces comprising a pair of similar, coaxially disposed, externally splined sections joined by an annular series of integral, flexible and resilient reed members, all of said reed members being correspondingly inclined obliquely with respect to the axes of said sections and holding the external splines of the sections normally in alignment with respect to each other so as to accommodate an internally splined workpiece thereon, said reed members being operative to rotate one of said sections relative to the other when said arbor is compressed along its axis so as to offset the external splines of the sections and press the same laterally in opposite directions against the internal splines of the workpiece whereby to hold the workpiece securely on the arbor, and means for limiting the relative rotational movement between the parts whereby to prevent overstressing of said reed members.

18. An arbor for chucking internally splined workpieces comprising a pair of tubular, externally splined sections joined by an annular series of integral, flexible and resilient reed members, all of said reed members being correspondingly inclined obliquely with respect to the axes of the sections and normally holding the external splines of the sections in alignment, a shaft in said sections, and means fastening said shaft to one of said sections, said shaft and the other of said sections having confronting radial shoulders normally spaced apart, said reed members being operative to rotate one of said sections relative to the other when the arbor is placed axially under compression, and said shoulders being engageable by such movement of the sections to prevent overstressing of said reed members.

References Cited in the file of this patent

UNITED STATES PATENTS

| 2,507,999 | Schjolin | May 16, 1950 |
| 2,626,811 | Hohwart et al. | Jan. 27, 1953 |
| 2,658,764 | Parker et al. | Nov. 10, 1953 |
| 2,684,854 | Hohwart et al. | July 27, 1954 |
| 2,762,629 | Dalby | Sept. 11, 1956 |